United States Patent Office 3,347,948
Patented Oct. 17, 1967

3,347,948
HYDROCARBON SEPARATION PROCESS
William Featherstone, Norton-on-Tees, England, assignor to Imperial Chemical Industries Limited, London, England, a corporation of Great Britain
No Drawing. Filed Apr. 21, 1964, Ser. No. 361,536
Claims priority, application Great Britain, May 1, 1963, 17,220/63
10 Claims. (Cl. 260—674)

This invention relates to processes for the separation of hydrocarbons.

Olefines and aromatic hydrocarbons may be extracted from admixtures with saturated hydrocarbons by aqueous solutions of silver salts, particularly silver fluoborate and silver fluosilicate, which are capable of forming complexes with the olefine or aromatic hydrocarbons while leaving the saturated hydrocarbons unaffected. The unsaturated hydrocarbons retained by the silver salts may be recovered by, for example, heating the aqueous solution or by treating it with an organic solvent from which the recovered hydrocarbon may be readily separated for example by distillation. The salt solution is regenerated at the same time as the unsaturated hydrocarbons are recovered.

It is known that while certain mixtures of hydrocarbons, for example petrol obtained by the deep thermal cracking of light naphtha, are a rich source of olefines and, to a less extent of aromatic hydrocarbons, they also contain dienes such as cyclopentadiene. We have found that attempts to separate such mixtures by the above-mentioned process are frustrated by the dienes which form precipitates with the salt in the extracting solution. This can be an embarrassment, for example, by causing loss of reactant and by clogging up the apparatus and thus preventing a free flow of the reactants in it.

The present invention thus provides a process for the extraction of aliphatic and aromatic hydrocarbons from liquid or gaseous hydrocarbon mixtures which contain dienes in which in a preliminary treatment the dienes are first substantially completely removed and the hydrocarbon mixture is then contacted with an aqueous solution of salt of a heavy metal capable of forming complexes with olefines to remove the olefines and aromatic hydrocarbons.

It is preferred that the cyclic dienes present in the hydrocarbon mixture be removed so that their residual concentration in the mixture is less than 1% by weight. Limited amounts (less than 5% by weight) of the short chain acyclic diolefines, isoprene and piperylene, may be tolerated in the hydrocarbon mixture during the extraction treatment as these have little tendency to form insoluble precipitates with heavy metal salts in contrast to cyclic diolefines and higher acyclic diolefines.

The dienes present in the hydrocarbon mixture may be removed in the preliminary treatment, for example by chemical means such as the Diels Alder reaction, in which the hydrocarbon mixture is refluxed with a reagent such as maleic anhydride, fumaric anhydride, parabenzoquinone, alpha-naphthaquinone, acrolein, acrylic ester and acrylonitrile. These compounds form relatively involatile condensates with the dienes from which the inactive components of the hydrocarbon mixture, including the olefine and aromatic content, as well as paraffins, may be distilled off or otherwise be separated. Other methods of removing the dienes include selective hydrogenation or extraction with sulphur dioxide to form sulphones with the dienes which are relatively involatile or insoluble in the organic phase, and subsequent separation of the unaffected hydrocarbon components.

The heavy metal salt is preferably of copper, mercury and in particular silver, for example silver nitrate, silver fluoborate or silver fluosilicate, either alone or in conjunction with one another or with other salts.

It is preferred that the extraction of the diene free hydrocarbon mixture is carried out in a continuous process comprising extraction and recovery zones through which the aqueous solution is circulated in counter-current flow to a stream of the hydrocarbon mixture which is substantially free from diolefines, in the extraction zone, and a stream of a regenerating fluid in the recovery zone.

The regenerating fluid referred to above may be steam or other vapour or it may be an organic solvent such as a paraffin. Other means whereby the olefines and aromatics may be recovered from their aqueous heavy metal salt solution including heating and reduction in pressure.

As described above, particularly suitable hydrocarbon fractions for use in the process of the present invention are petrol fractions for example those obtained by deep thermal cracking of light naphtha.

*Example 1*

In this example the petrol used showed the following analysis:

| | Percent by weight |
|---|---|
| Total dienes | 13 approx. |
| Cyclopentadiene | 2.5 |
| Isoprene | 2.6 |
| Piperylene | 2.1 |
| Total olefines and dienes ($C_4$–$C_{10}$) | 27.5 |
| Benzene | 18.0 |
| Toluene | 12.5 |
| Paraffins etc. | 40.0 |
| Other aromatics | 2–3 |

B.P. range below 130° C.

A portion of the petrol was refluxed for 2 hours at 40–45° C. with a stoichiometric excess of maleic anhydride. The unreacted components of the petrol were then distilled off. The diolefine content of the distillate was as follows:

| | Percent by wt. |
|---|---|
| Total dienes | 3 approx. |
| Cyclopentadiene | <0.1 |
| Isoprene | 0.7 |
| Piperylene | 0.9 |

The petrol distillate was extracted in a batchwise operation at room temperature with an equal volume of an aqueous solution of silver fluoborate containing 800 grams of silver per litre. During the extraction no precipitate was observed. The extracting solution was then gently heated, to recover a distillate which was found to contain between 60 and 75% by weight aromatic hydrocarbons and 25–40% by weight olefinic material and amounted in all to 25% by weight of the unreacted petrol.

*Example 2*

In this example the petrol was treated with maleic anhydride as in Example 1, but thereafter extracted in a counter-current continuous operation with three times its volume of the silver fluoborate solution at 20° C. for extraction of olefines and aromatic hydrocarbons. Throughout the extraction no precipitation occurred. The aqueous extract was then contacted with n-decane to recover the dissolved hydrocarbons and regenerate the salt solution in a series of three mixer/settler operations, each consisting of a stirred tank in which the extract was stirred with its own volume of n-decane for half an hour at 20° C. and then run into a settler tank. From here the aqueous phase was run into the next mixer tank and the operation repeated.

The organic phase from the settler tanks, comprising a solution of the olefine and aromatic content of the petrol in decane, was bulked and distilled to recover the olefines and aromatic hydrocarbons.

The weight yield of olefines and aromatic hydrocarbons was 39% of the total petrol treated, comprising 44% benzene, 20% toluene and the remainder olefines.

I claim:

1. A process for the extraction of olefinic and aromatic hydrocarbons from liquid or gaseous hydrocarbon mixtures containing dienes comprising treating the hydrocarbon mixture to remove substantially completely the dienes and contacting the substantially diene-free hydrocarbon mixture with an aqueous solution of a salt selected from the group consisting of silver fluoborate, silver fluosilicate and mixtures thereof whereby complexes thereof are formed to remove the olefines and aromatic hydrocarbons from the said hydrocarbon mixture.

2. A process according to claim 1 in which the olefines and aromatic hydrocarbons are recovered from their complexes with the said salt.

3. A process according to claim 1 in which the olefines and aromatic hydrocarbons are recovered from their complexes by heating or reduction in pressure or by treatment with steam or an organic solvent in which the olefines and aromatic hydrocarbons are soluble.

4. A process according to claim 1 in which the substantially diene-free hydrocarbon mixture is contacted with the aqueous solution of said salt in a continuous process comprising extraction and recovery zones in which the said aqueous solution is contacted in countercurrent flow with a stream of the hydrocarbon mixture in the extraction zone and to a stream of a regenerating fluid in the recovery zone.

5. A process according to claim 4 in which the regenerating fluid is a paraffin.

6. A process according to claim 1 in which the dienes are removed substantially completely from the hydrocarbon mixture by means of a Diels Alder condensation whereby an involatile condensation product is formed between the dienes and the Diels Alder reagent, and the diene-free hydrocarbon mixture removed therefrom.

7. A process according to claim 6 in which the reagent used to treat the hydrocarbon mixture in the Diels Alder condensation is selected from maleic anhydride, fumaric anhydride, parabenzoquinone, alpha-naphthaquinone, acrolein, acrylic ester or acrylonitrile.

8. A process according to claim 1 in which the dienes are selectively hydrogenated.

9. A process according to claim 1 in which the dienes are removed substantially completely from the hydrocarbon mixture by extracting the mixture with sulphur dioxide which reacts with the dienes to form sulphones which are relatively involatile or insoluble in the hydrocarbon mixture, and separating the substantially diene-free hydrocarbon mixture therefrom.

10. A process according to claim 1 in which the hydrocarbon mixture is a petrol fraction obtained by deep thermal cracking of light naphtha.

References Cited

UNITED STATES PATENTS

| | | | |
|---|---|---|---|
| 2,077,041 | 4/1937 | Davis et al. | 260—677 |
| 2,104,956 | 1/1938 | Stern et al. | 260—674 |
| 2,386,335 | 10/1945 | Morris | 260—666 |
| 2,436,149 | 2/1948 | Menshih | 260—681.5 |
| 3,130,243 | 4/1964 | Dunn et al. | 260—674 |
| 3,200,165 | 8/1965 | Eisenlohr et al. | 260—674 |
| 3,201,489 | 8/1965 | Knaack | 260—674 |

FOREIGN PATENTS

| | | |
|---|---|---|
| 1,293,986 | 4/1962 | France. |
| 987,065 | 3/1965 | Great Britain. |

DELBERT E. GANTZ, *Primary Examiner.*

C. E. SPRESSER, *Assistant Examiner.*